Jan. 16, 1962 V. W. CARLSON 3,017,121
MATERIAL APPLYING ATTACHMENT FOR POWER MOWERS
Filed Nov. 30, 1959

INVENTOR.
Vern W. Carlson
BY
Hovey, Schmidt, Johnson & Hovey
ATTORNEYS.

United States Patent Office 3,017,121
Patented Jan. 16, 1962

3,017,121
MATERIAL APPLYING ATTACHMENT FOR POWER MOWERS
Vern W. Carlson, 9212 E. 87th St. Kansas City, Mo.
Filed Nov. 30, 1959, Ser. No. 856,034
2 Claims. (Cl. 239—129)

This invention relates to a lawn mower attachment adapted to permit application of liquid insecticides, weed killers, fertilizers or other materials, and has for its primary object the advantageous use of the pressure of exhaust emanating from the engine of the mower for assisting in the proper application of the liquids.

It is the most important object of the present invention to include in the aforementioned attachment, a perforated manifold that is not only connected with the exhaust pipe of the engine, but with a liquid supply tank carried by the mower, all in a manner that causes the relatively high pressure exhaust gases to force the liquid from the perforations of the manifold in a spray so as to evenly and thoroughly distribute the fluids over the lawn as the mower is advanced.

Another important object of the present invention is to include in the coupling between the manifold, the exhaust pipe and the supply tank, a control tube which properly directs the liquid longitudinally of the manifold and into the stream of exhaust gases emanating from the lawn mower engine and passing into the manifold at one end of the latter.

Figure 1:
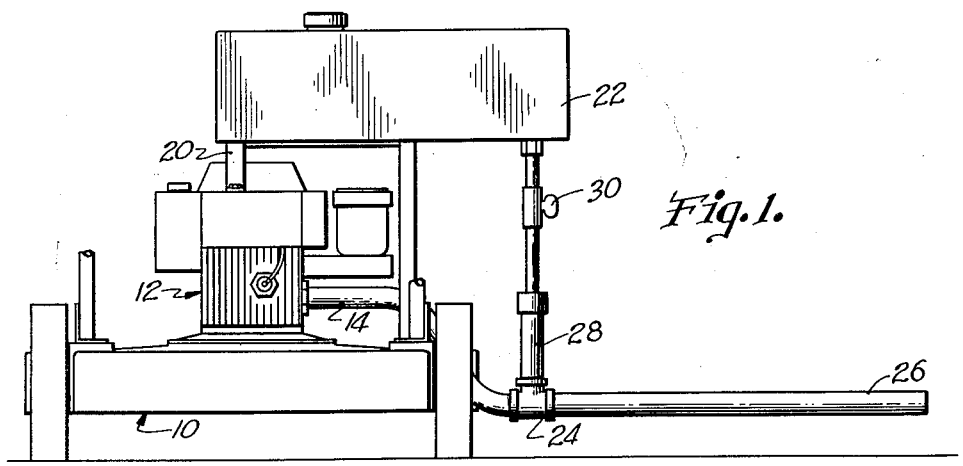
FIG. 1 is an end elevational view of a lawn mower having a material-applying attachment made pursuant to my present invention mounted thereon.

A conventional wheeled lawn mower broadly designated by the numeral 10, is illustrated in FIG. 1 of the drawing, including in the usual manner an engine 12, and in lieu of the usual muffler (not shown) that is provided for engine 12, I substitute an exhaust pipe 14 which extends laterally from the engine 12 and is suitably bent to terminate alongside the lawn mower 10 closely adjacent the ground.

Figure 4:
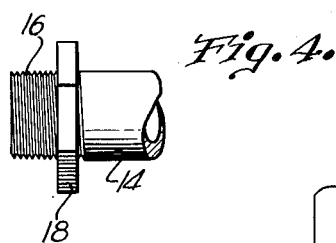
FIG. 4 is a fragmentary, elevational view illustrating that end of the exhaust pipe which is attached to the engine of the lawn mower.
Figure 3:
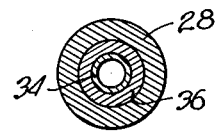
FIG. 3 is a fragmentary, detailed, cross-sectional view taken on line 3—3 of FIG. 2.

As shown in FIG. 4 of the drawing, the exhaust pipe 14 has external threads 16 for attachment to the engine 12 and, if desired, there may be provided a lock nut 18 to avoid any swinging movement of the exhaust pipe 14.

Suitable bracket means 20 is provided on the lawn mower 10 for supporting a liquid supply tank 22, it being understood that such liquid may be in the form of a fertilizer, an insecticide, or any other material that is to be applied.

A T 24 on the outermost end of the exhaust pipe 14 receives an elongated, horizontal manifold 26 and an upstanding conduit 28, the latter having a shut-off valve 30 interposed therein and depending from the tank 22 with which the same communicates.

Figure 2:
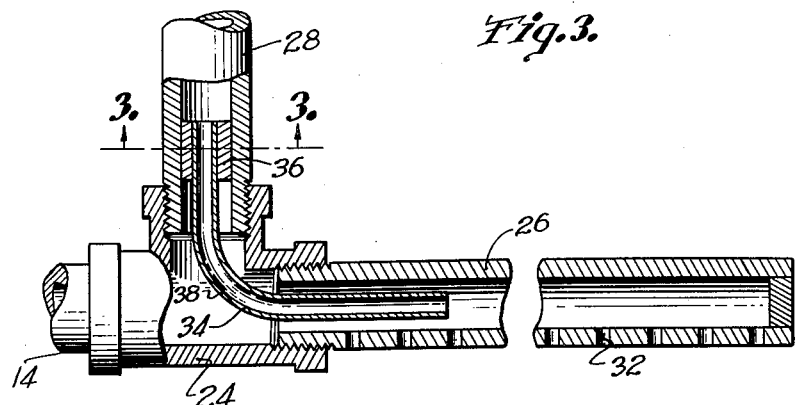
FIG. 2 is an enlarged, fragmentary view partially in section showing the liquid distributing manifold, the control tube, and the operable connection with the exhaust pipe and the supply conduit.

The manifold 26 has a series of perforations 32 therein disposed as seen in FIG. 2, to direct the liquid spray downwardly toward the lawn, and it can now be seen that manifold 26 not only receives the exhaust gases emanating under pressure from the engine 12, but receives the liquid from tank 22 as metered through proper adjustment of the valve 30.

It is desired, in order to produce best results, that a tube 34 be mounted in the conduit 28 and held centered therewithin by a sleeve 36 which surrounds tube 34 at its upper end and is tightly fitted between the inner surface of conduit 28 and the outer surface of tube 34.

From the sleeve 36, the tube 34 extends downwardly below the lowermost end of conduit 28 into an arcuate bend 38 within the T 24. Thence, the tube 34 extends laterally into the manifold 26 coaxially with the latter. It can be seen in FIG. 2 of the drawing that the diameter of the tube 34 is appreciably less than the inside diameters of both the conduit 28 and the manifold 26.

It can now be appreciated that when the engine 12 is operating, whether or not the lawn is mowed at the same time, the exhaust gases emanating from the engine 12, pass into the manifold 26 from the pipe 14 and around that part of the tube 34 which extends into manifold 26.

At the same time the liquid gravitates from the tank 22, through the conduit 28 and into the tube 34 at a rate dependent upon the setting of the valve 30. Such liquid discharges into the manifold 26 from the tube 34 and is picked up by the exhaust gases, causing such liquid to immediately become heated and vaporize. In any event, the liquid is forced from the manifold 26 by the pressure of the exhaust fumes rather than solely by gravity. Hence, the discharge from the perforations 32 is in the form of a relatively fine spray rather than mere gravitation in the form of liquid globules or streams.

By virtue of such action the insecticide, fertilizer or the like is evenly distributed over the lawn and covers a swath that is preferably substantially as wide as the cut made by the mower itself.

Having thus described the invention what is claimed as new and desired to be secured by Letters Patent is:

1. In combination with a wheeled lawn mower having an engine provided with an exhaust pipe, a liquid supply tank carried by the lawn mower; an elongated, horizontal manifold extending from said mower transversely to the normal direction of travel of the latter having one end thereof closed and the opposite end thereof communicating with and connected to the exhaust pipe in end-to-end relationship thereto, there being a series of perforations in the manifold throughout its length; a conduit depending from the tank and communicating with the exhaust pipe and the manifold adjacent said opposite end of the latter; a liquid conveying tube in the conduit and extending a substantial distance into the manifold through said opposite end of the latter for directing fluid from said supply tank toward the closed end of the manifold, a portion of the tube being coaxial with the manifold and of appreciably smaller diameter than the manifold and having a heat exchange surface over which exhaust gases flow to heat and vaporize liquid flowing therein; and a sleeve surrounding the tube in the conduit and tightly fitted between the tube and the conduit.

2. The combination as set forth in claim 1, wherein said perforations are disposed in the normally lowermost portion of said manifold, said tube having a downwardly directed, arcuate portion intermediate the ends thereof and adjacent the opposite end of said manifold.

References Cited in the file of this patent

UNITED STATES PATENTS

| 2,685,146 | Stevens | Aug. 3, 1954 |
| 2,835,533 | Baker | May 20, 1958 |
| 2,865,671 | Jensen | Dec. 23, 1958 |

FOREIGN PATENTS

| 1,678 | Great Britain | 1905 |